(12) United States Patent
Tenra et al.

(10) Patent No.: US 7,762,634 B2
(45) Date of Patent: Jul. 27, 2010

(54) VACUUM HEAT INSULATION MATERIAL AND COLD RESERVING APPARATUS WITH THE SAME

(75) Inventors: Tomohisa Tenra, Shiga (JP); Masamichi Hashida, Shiga (JP); Kazuo Hashimoto, Shiga (JP)

(73) Assignee: Panasonic Corporation, Osaka (JP)

( * ) Notice: Subject to any disclaimer, the term of this patent is extended or adjusted under 35 U.S.C. 154(b) by 636 days.

(21) Appl. No.: 11/569,390

(22) PCT Filed: Jun. 2, 2005

(86) PCT No.: PCT/JP2005/010159

§ 371 (c)(1),
(2), (4) Date: Nov. 20, 2006

(87) PCT Pub. No.: WO2005/119118

PCT Pub. Date: Dec. 15, 2005

(65) Prior Publication Data

US 2007/0196665 A1  Aug. 23, 2007

(30) Foreign Application Priority Data

| Jun. 3, 2004 | (JP) | ............................. 2004-165281 |
| Jul. 1, 2004 | (JP) | ............................. 2004-195182 |
| Jul. 23, 2004 | (JP) | ............................. 2004-215182 |
| Oct. 20, 2004 | (JP) | ............................. 2004-305342 |

(51) Int. Cl.
*A47B 96/00* (2006.01)

(52) U.S. Cl. ...................... 312/5; 312/406.1; 312/406.2

(58) Field of Classification Search ................. 312/405, 312/406, 406.1, 406.2
See application file for complete search history.

(56) References Cited

U.S. PATENT DOCUMENTS 6,938,968 B2 *  9/2005  Tanimoto et al. ............ 312/406
7,571,582 B2 *  8/2009  Hirai et al. ................ 52/784.15

FOREIGN PATENT DOCUMENTS

| EP | 1 275 894 A1 | 1/2003 |
| EP | 1 298 229 A1 | 4/2003 |
| JP | 2568485 | 2/1986 |
| JP | 05-322072 | 12/1993 |
| JP | 2548782 | 8/1996 |

(Continued)

OTHER PUBLICATIONS

International Search Report for Application PCT/JP2005/010159, dated Sep. 20, 2005.

*Primary Examiner*—Thao T. Tran
(74) *Attorney, Agent, or Firm*—RatnerPrestia

(57) ABSTRACT

A vacuum heat insulation material has a covering material which is a lamination body including a sealant layer, a metal foil layer, a first plastic film layer, and a second plastic film layer which are laminated in this order from inside to outside via adhesive layers. When a foreign body is pierced into the vacuum heat insulation material, the propagation of breakage caused by the piercing is blocked somewhere inside the lamination body, thereby preventing the formation of through-pinholes. This results in the provision of a high-quality vacuum heat insulation material with excellent long-term insulation performance by using a covering material excellent in gas barrier properties and pinhole resistance to the piercing of minute foreign bodies.

25 Claims, 7 Drawing Sheets

FOREIGN PATENT DOCUMENTS

| | | |
|---|---|---|
| JP | 09-317986 A | 12/1997 |
| JP | 10-259222 | 9/1998 |
| JP | 11-079234 | 3/1999 |
| JP | 2000-255017 A | 9/2000 |
| JP | 2003-233021 A | 8/2003 |
| JP | 2003-262296 A | 9/2003 |
| JP | 2003-340972 A | 12/2003 |
| JP | 2004-009615 A | 1/2004 |
| JP | 2004-9615 A | 1/2004 |
| JP | 2004-035765 A | 2/2004 |
| JP | 2004-035799 A | 2/2004 |
| JP | 2004-051898 A | 2/2004 |
| JP | 2004-130654 A | 4/2004 |

* cited by examiner

US 7,762,634 B2

VACUUM HEAT INSULATION MATERIAL AND COLD RESERVING APPARATUS WITH THE SAME

THIS APPLICATION IS A U.S. NATIONAL PHASE APPLICATION OF PCT INTERNATIONAL APPLICATION PCT/JP2005/010159.

TECHNICAL FIELD

The present invention relates to a vacuum heat insulation material consisting of a core material and a covering material that covers the core material and is vacuum-sealed.

BACKGROUND ART

Energy and environmental issues have become urgent in recent years, and various measures have been suggested to use energy effectively.

As one of the measures, energy saving in household electrical appliances including refrigerators as consumer products is drawing attention. To achieve energy saving in refrigerators, it is necessary to use cold heat effectively and to improve the insulation of the insulating box which forms a refrigerator housing. For this purpose, it is effective that the insulating box is made of an insulation material with high insulation performance. As such high-performance insulation material, vacuum heat insulation materials containing glass fiber as a core material are being used these years.

A vacuum heat insulation material is formed by inserting a core material made of a porous body into a covering material and vacuum-sealing the covering material. Therefore, the covering material is required to have both high gas-barrier properties to maintain the internal pressure for a long time and a durability to prevent the formation of pinholes while being handled.

For this reason, a packaging material is typically composed of an outermost layer, an intermediate layer, and an innermost layer made of the following materials. The outermost layer is a protective film such as a polyethylene terephthalate film, the intermediate layer is an aluminum foil or a deposited film with excellent gas-barrier properties, and the innermost layer is an olefin-based sealant film with excellent heat-sealing properties.

Japanese Patent No. 2568485, for example, describes an insulator package as a vacuum heat insulation material with excellent resistance to pinholes that can be caused when the covering material is damaged. The insulator package includes a hermetically sealed container composed of the following four films: a nylon film, a polyethylene terephthalate film, a gas barrier layer, and a polyethylene film which are laminated in this order from outside to inside.

Since the nylon film laminated as the outermost layer of the covering material excels in scratch resistance and pinhole resistance, this conventional structure is effective to prevent the pinholes that can be caused by external friction or foreign bodies. However, this resistance is not sufficient to the pinholes that can be caused from the innermost sealant layer side by foreign bodies entered during vacuum packaging.

Japanese Patent Unexamined Publication No. H11-79234 describes a packaging material suitable to vacuum packaging. This packaging material includes an expanded plastic film and a sealant layer which are stacked on a 10 to 70 g/m² thick paper base with joining layers disposed therebetween, the expanded plastic film being a metal oxide deposited layer. This structure can form the corners of a material to be vacuum-packaged in a smooth manner and also prevent a reduction in barrier properties such as moisture barrier properties after the material is vacuum-packaged.

This conventional structure is effective to prevent the pinholes that can be caused by impact or friction from outside, but not to the pinholes that can be caused by foreign bodies entered during vacuum packaging, or caused from inside the innermost layer in the case of some types of materials to be packaged.

Japanese Patent Unexamined Publication No. H09-317986 discloses an attempt to improve the puncture resistance of a plastic layer so as to provide a vacuum heat insulation material with excellent resistance to the pinholes that can be caused by the piercing of foreign bodies.

In this conventional vacuum heat insulation material, the films composing the covering material are strongly laminated to each other with high peel strength. A film can be broken when subjected to the piercing stress of a sharp-point foreign body because the film is compressed due to stress concentration. When compressed, an object increases in length in the direction perpendicular to the compressive stress. When broken, the object is subjected to a sudden shear stress in the direction perpendicular to the compressive stress. The force caused in the perpendicular direction by the compression acts as a tensile stress on the films laminated with the adhesive, thereby breaking these films concurrently. This results in a through-pinhole even when a foreign body is shorter in length than the thickness of the covering material.

Japanese Patent Unexamined Publication No. 2003-340972 describes the provision of a layer with low peel strength so as to prevent a plastic laminate film from being broken or having pinholes. This conventional structure discloses an impact resistant packaging material used for a packaging bag for storing frozen food or frozen materials with sharp edges. The impact resistant packaging material prevents the packaging bag from being broken by vibration during transportation in the low-temperature distribution or having pinholes by drop impact caused by inappropriate handling.

FIG. 12 is a sectional view of a conventional impact resistant packaging material. In FIG. 12, impact resistant packaging material 96 consists of the following: base material 91 formed of a synthetic resin layer; print ink layer 95 formed on a surface of base material 91 excluding sealing section 97 on the periphery of base material 91; impact resistant resin layer 92 formed on print ink layer 95 in such a manner as to cover the entire surface of base material 91; joining layer 93 formed thereon, and sealant layer 94 formed further thereon. Another method for producing impact resistant packaging material 96 is as follows. Print ink layer 95 is formed on a surface of base material 91 excluding sealing section 97 on the periphery of base material 91. Impact resistant resin layer 92 is formed exclusively on print ink layer 95. Sealant layer 94 is formed on impact resistant resin layer 92 via joining layer 93, which is formed on the entire surface of base material 91.

Impact resistant packaging material 96 with the conventional structure can be prevented from having through-pinholes when subjected to an external impact such as dropping with ice or other products inside. The prevention can be achieved by forcing print ink layer 95 with low peel strength to be peeled when base material 91 is broken.

The laminate film composing this conventional impact resistant packaging material, however, has the following problems when used as the covering material of a vacuum heat insulation material. The laminate film is pressed against the core material by the atmospheric pressure, so that the excessive parts of the laminate film that cannot tightly cover the core material are folded to form numerous wrinkles. As a result, in the laminate film including a print ink layer with low peel strength, the wrinkles formed on the print ink layer cause the film bases to be easily peeled from each other.

In this conventional packaging material, the main purpose of improving the pinhole resistance is to prevent the packaging materials from being torn by impact or being pierced by contents with a certain bulk such as frozen materials. Therefore, the improvement of the pinhole resistance is not sufficient for the pinholes that can damage the covering material of the vacuum heat insulation material, such as pinholes caused by glass shot, powder dust, and minute foreign bodies including glass fiber.

Unlike ordinary vacuum packaging materials, vacuum heat insulation materials are required to maintain high vacuum for a long time of ten years, thus needing a laminate film with high gas-barrier properties. Therefore, the conventional packaging material, in which insufficient gas barrier properties cause degradation in insulation performance with time, cannot be used as the covering material for vacuum heat insulation materials.

SUMMARY OF THE INVENTION

The present invention, which has been devised to solve the aforementioned conventional problems, has an object of providing a high-quality vacuum heat insulation material with excellent long-term insulation performance by providing a laminate film with excellent pinhole resistance and excellent gas barrier properties.

In order to solve the aforementioned conventional problems, a vacuum heat insulation material of the present invention includes a core material and a covering material which covers the core material and is vacuum sealed, wherein the covering material is a lamination body including two or more plastic film layers, a metal layer, and joining layers for joining therebetween, and the lamination body has a stress-relieving structure in inner layers thereof, the stress-relieving structure being able to prevent penetration and propagation of breakage in a direction perpendicular to the lamination body. When the lamination body is pierced by a foreign body, the propagation of breakage caused by the piercing can be blocked somewhere in the lamination body, thereby preventing the lamination body from having through-pinholes.

Figure 1:
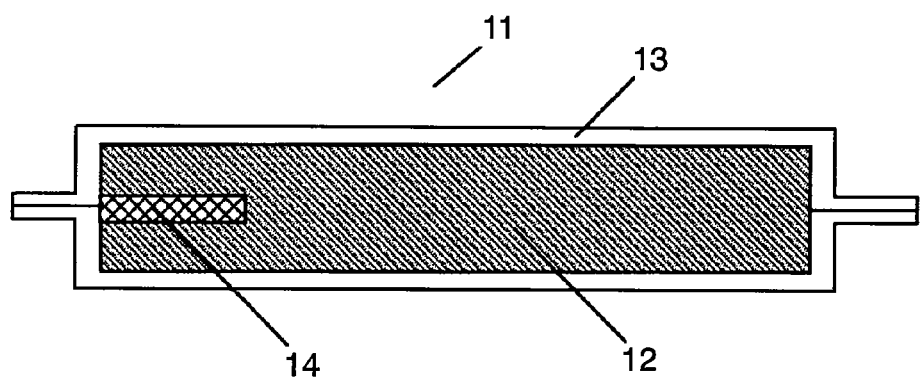
FIG. 1 is a sectional view of a vacuum heat insulation material of a first embodiment of the present invention.

| REFERENCE MARKS IN THE DRAWINGS | |
|---|---|
| 11 | vacuum heat insulation material |
| 12 | core material |
| 13 | covering material |
| 21 | sealant layer |
| 22 | metal foil layer |
| 23, 29 | first plastic film layer |
| 24 | second plastic film layer |
| 25, 26 | joining layer |
| 27 | deposited layer |
| 28, 48 | coextruded film layers |
| 51 | refrigerator |
| 52 | insulating box |
| 53 | outer case |
| 54 | inner case |
| 55 | rigid urethane foam |
| 56 | partition board |
| 57 | refrigerating chamber |
| 58 | freezing chamber |
| 59 | motorized damper |
| 60 | fan motor |
| 61 | defrost heater |
| 62 | evaporator |
| 63 | compressor |
| 64 | condenser |
| 65 | capillary tube |
| 66 | door body |

DETAILED DESCRIPTION OF PREFERRED EMBODIMENTS

A vacuum heat insulation material of the present invention includes a covering material which is a lamination body composed of two or more bonded plastic films and covers a core material. The vacuum heat insulation material includes at least a core material and a covering material which covers the core material and is vacuum sealed. The covering material is a lamination body including two or more plastic film layers, a metal layer, and joining layers for joining therebetween, and the lamination body has a stress-relieving structure in inner layers thereof, the stress-relieving structure being able to prevent penetration and propagation of breakage in a direction perpendicular to the lamination body.

The stress-relieving structure refers to a structure that can prevent the breakage of a plastic film caused by the piercing of glass shot or the like from propagating to an outer adjacent plastic film inside the lamination body. To achieve the prevention, the stress-relieving structure includes at least one of the following two structures: (1) a structure which causes one of the interfaces of the lamination body to be peeled, and (2) a structure which causes either a plastic film or a joining layer of the lamination body to be broken when the lamination body is pieced by a foreign body and subjected to a compressive stress in the direction perpendicular to itself.

Assume that the covering material is pierced by something existing on the surface of the core material, for example, a foreign body with a sharp corner such as glass shot or a small object such as a powder dust. An inner film which has been pierced by the foreign body is extended outward by the compression of the films applied during vacuum sealing. When the inner film is broken, the compressive force is spread outward from the pierced point. As a result, a tensile force or a shear force is propagated from the pierced point via an adhesive layer to an outer adjacent film in the laminate film.

When the shear force which breaks the outer film is smaller than the shear force which breaks the adhesive layer, the adhesive layer is broken first. This reduces the piercing force of the foreign body to the level of being blocked from propagation, thereby reducing the formation of the through-pinholes in the laminate film.

In addition, when the laminate film has an interface with low shear strength or with low peel strength, the shear force causes this interface to be peeled, thereby reducing the piercing force. This blocks the propagation of the piercing force, thereby reducing the formation of through-pinholes in the laminate film.

Thus forming a layer with low shear strength or an interface with low shear strength in the lamination body can provide a laminate film with both sufficient peel strength and excellent pinhole resistance.

Furthermore, the laminate film includes plastic films having a metal foil layer, a metal-deposited layer, or a ceramic-deposited layer, so that the vacuum heat insulation material can have excellent gas barrier properties and excellent long-term insulation performance.

The present invention can provide a high-quality vacuum heat insulation material with excellent long-term insulation performance by providing a covering material formed of a laminate film with excellent pinhole resistance and sufficient gas barrier properties as the covering material of the vacuum heat insulation material.

The present invention also relates to a vacuum heat insulation material formed of a laminate film including two or more plastic film layers and joining layers disposed therebetween. When the lamination body is pierced by a foreign body, the propagation of breakage caused by piercing can be blocked somewhere inside the lamination body to prevent the formation of through-pinholes which penetrates the entire covering material.

In general, when a laminate film is pierced by a foreign body or the like, the piercing force of the foreign body acts as a compressive force to break the laminate film. The broken laminate film causes a compressive force to spread outward from the center of the breakage, thereby acting as a shear force on the laminate film.

In this case, if the laminate film includes a layer with low shear strength, a layer with the lowest shear strength in the laminate film is broken. This disperses and reduces the piercing force so as to block the propagation of the piercing force to the adjacent layer, thereby preventing the formation of through-pinholes.

Alternatively, the laminate film may include an interface with low shear strength. In this case, an interface with the lowest shear strength in the laminate film is peeled to disperse and reduce the piercing force. This blocks the propagation of the piercing force to the adjacent layer, thereby preventing the formation of through-pinholes.

Further alternatively, if there is a layer or an interface with low shear strength in the laminate film excluding the outermost layer and the innermost layer, the piercing force is more efficiently dispersed and reduced so as to be blocked from propagation. As a result, the formation of through-pinholes can be prevented.

The present invention also relates to a vacuum heat insulation material in which the propagation of breakage caused by piercing can be blocked by either breaking one layer or peeling the interface between two layers of the lamination body including two or more plastic film layers and joining layers. The piercing force to break the layer can be efficiently dispersed and reduced by breaking the layer with low shear strength or peeling the interface with low shear strength, thereby blocking the propagation of the piercing force. As a result, the formation of through-pinholes can be prevented.

The present invention also relates to a vacuum heat insulation material in which the layer to be broken is an adhesive layer in the lamination body including two or more plastic film layers and joining layers disposed therebetween.

Breaking the adhesive layer used in the laminate film can minimize the damage to the functions necessary for the laminate film, such as barrier properties. Furthermore, the laminate film has high flexibility in design with no limitations in the laminate structure, allowing any adhesive layer to be the layer with low shear strength.

In general, the modulus of elasticity and shear strength of an adhesive are in a proportional relation to each other, and the shear strength decreases with decreasing modulus of elasticity. Therefore, the shear strength of the adhesive can be decreased using an adhesive with a low modulus of elasticity. As a result, when the laminate film is pierced by a foreign body, the adhesive layer breaks before the foreign body penetrates the laminate film. This can block the propagation of the piercing force of the foreign body, thereby reducing the formation of through-pinholes.

The present invention also relates to a vacuum heat insulation material in which an adhesive layer is made of urethane resin having a lower modulus of elasticity than a plastic film to which the urethane resin is applied.

The urethane resin used as the adhesive has a smaller modulus of elasticity and is more flexible than the plastic film to which the adhesive is applied. Therefore, when a force acts in the direction for a foreign body inside to pierce the covering material, the joining layer absorbs the distortion to prevent the piercing from causing pinholes.

In general, the modulus of elasticity and shear strength of an adhesive are in a proportional relation to each other, and the shear strength decreases with decreasing modulus of elasticity. Therefore, the shear strength of the adhesive can be decreased using an adhesive with a low modulus of elasticity. As a result, when the covering material is pierced by a foreign body, the joining layer breaks before the foreign body penetrates the covering material. This can block the propagation of the piercing force of the foreign body, thereby reducing the formation of pinholes.

In conclusion, the vacuum heat insulation material can have excellent pinhole resistance when a foreign body such as glass shot is accidentally entered into the core material made of short glass fiber.

The present invention also relates to a vacuum heat insulation material in which the adhesive applied to at least one of the interlayers of the lamination body is a urethane resin containing a polyisocyanate and a polyester polyol. The equivalent ratio of polyisocyanate to polyester polyol is not less than 1 and not more than 3, indicating that the urethane resin contains an excess of polyisocyanate.

Urethane resin can have elasticity and the properties similar to those of thermoplastic resin when there are few bonds formed by the allophanate reaction or the biuret reaction which are cross-linking reactions of an isocyanate composing the urethane resin, or by the isocyanurate reaction, the carbodiimide reaction, the uretdione reaction, or the like which are self-addition reactions of an isocyanate.

As a result, it has been turned out that the aforementioned equivalent ratio allows the urethane resin forming the joining layer to have a target modulus of elasticity.

The present invention also relates to a vacuum heat insulation material in which the covering material is a lamination body; the adhesive applied to at least one of the interlayers of the lamination body is a urethane resin; and the urethane resin containing an aliphatic polyisocyanate is used as the joining layer.

In order to have a low modulus of elasticity, a polymer compound is required to have a molecular structure which is linear to some extent in terms of a chemical structure, and therefore the isocyanate component is bifunctional or nearly bifunctional. Consequently, in order to obtain a low modulus of elasticity of the urethane resin, it is particularly effective to use an aliphatic polyisocyanate such as hexamethylene-diisocyanate (HDI), trimethylhexamethylene-diisocyanate (TMDI), or lysine-diisocyanate (LDI).

These isocyanates can decrease the modulus of elasticity of the urethane resin forming the joining layer.

The present invention also relates to a vacuum heat insulation material in which a joining layer is made of urethane resin containing an aliphatic polyester polyol and an aliphatic polyisocyanate.

Concerning the polyol component, an aliphatic polyester polyol can be used to further decrease the modulus of elasticity of the urethane resin forming the joining layer.

The present invention also relates to a cold reserving apparatus which is used in a temperature range not more than the normal temperature and is provided with the vacuum heat insulation material of the present invention. The cold reserving apparatus includes an insulating box and an insulating door body, and in at least one of the insulating box and the insulating door body, the vacuum heat insulation material is provided between an inner case and an outer case which have a space therebetween filled with rigid resin foam.

In general, plastic, which is a polymer compound, tends to become less flexible, harder, and more fragile and also to increase its modulus of elasticity with decreasing temperature. However, the joining layers of the covering material composing the vacuum heat insulation material used in the cold reserving apparatus inherently have a low modulus of elasticity and therefore can maintain sufficient flexibility when used in a temperature range not more than the normal temperature.

In the cold reserving apparatus used at temperatures not more than the normal temperature, the urethane resin adhesive has a lower modulus of elasticity than the adherend to which the urethane resin adhesive is applied. Therefore, even when a force acts in the outward direction for a foreign body inside to pierce the covering material, the joining layers absorb the distortion to prevent the piercing from causing pinholes.

The lamination body is preferably formed by the dry lamination using a dry-lamination adhesive. Alternatively, a part of the lamination body can be formed using the extrusion lamination which forms the joining layer by melt-extruding olefin resin.

In the case of the dry lamination, the adhesive can be coated by gravure coating, reverse coating, or the like. The amount of coating of the adhesive (solid content) is normally 2 to 10 g/m$^2$, and the laminate film is aged normally at 20 to 50° C. for 20 to 120 hours so as to completely harden the adhesive.

On the other hand, the core material used in the present invention is preferably made of glass fiber in terms of insulation performance. Short glass fiber can be used without serious problems as long as it is a glass composition that can be fiberized. It is more preferable that an assembly of short glass fibers is formed of a lamination body of short glass fiber webs. The webs are bonded together by minimum entanglement that can maintain the integrity of the assembly and is homogeneously stacked in the thickness direction. It is furthermore preferable to use short glass fiber which does not contain any foreign bodies such as glass shot so as to prevent the covering material from having pinholes. Of general industrial products which satisfy these requirements, glass wool is preferable because it is inexpensive and easy to handle.

Although the fiber diameter is not particularly specified, fibers with a smaller diameter can provide more excellent insulation performance. However, in terms of economy, the average fiber diameter is preferably 3 to 5 μm.

The present invention also relates to a vacuum heat insulation material in which the layer to be broken is a plastic film layer in the lamination body including two or more plastic film layers and joining layers disposed therebetween.

Using the plastic film as the layer to be broken allows the layer with low shear strength to have a much larger thickness than the joining layers. Therefore, when the lamination body is pierced by a foreign body at a large force, the piercing force can be easily dispersed and reduced. This can ensure sufficient pinhole resistance to foreign bodies with large sizes or large aspect ratio such as fiber.

The present invention also relates to a vacuum heat insulation material in which the interface to be peeled is the interface between the adhesive layer and one of the metal foil layer, the deposited layer, and the plastic film layers in the lamination body including two or more plastic film layers and joining layers disposed therebetween.

Peeling the interface between the metal foil layer, the deposited layer, or one of the plastic film layers and the adhesive layer adjacent to one of these layers can minimize the damage to the functions necessary for the laminate film, such as barrier properties. Furthermore, the laminate film has high flexibility in design with no limitations in the laminate structure, allowing any adhesive layer to be the layer with low shear strength.

The present invention also relates to a vacuum heat insulation material in which the interface to be peeled is the interface between the deposited layer and the base film layer for deposition in the lamination body including two or more plastic film layers and joining layers disposed therebetween.

The propagation of breakage caused by piercing the laminate film can be blocked by peeling the interface with low shear strength so as to disperse and reduce the piercing force.

It has turned out that in particular when the interface between the deposited layer and the base film layer for deposition has a reduced shear strength, the pinhole resistance can be dramatically improved to minute foreign bodies such as glass fiber and fine powder dusts.

The peeling of the interface between the deposited layer and the base film layer for deposition could be performed by using a deposited film with poor deposition quality. However, when barrier properties are required, they can be obtained by precoating the surface of the deposited layer with resin which has a good adhesion with the deposited film.

The present invention also relates to a vacuum heat insulation material in which the interface to be peeled is an interface between plastic films formed by being coextruded and heat-sealed in the lamination body including two or more plastic film layers and joining layers disposed therebetween.

The interface between the plastic films formed by being coextruded and heat-sealed has a low shear strength. This is due to the low lamination strength of the interface between the heat-sealed plastic films. Using plastic films thus coextruded can improve the pinhole resistance.

Furthermore, coextruded films can perform pinhole resistance measurements at a lower cost than a laminate film formed by dry lamination.

The present invention also relates to a vacuum heat insulation material in which one of the layers or one of the interfaces of the lamination body has a shear strength of not more than 500 N/cm$^2$ in the lamination body including two or more plastic film layers and joining layers disposed therebetween.

The shear strength of not more than 500 N/cm$^2$ allows the breakage of a layer or the peeling of an interlayer when a piercing force is applied. In other words, the shear strength of not more than this level can attenuate the piercing force efficiently, thereby blocking the propagation of breakage to the next layer.

The present invention also relates to a vacuum heat insulation material in which one of the interfaces of the lamination body has a peel strength of not more than 250 N/m in the lamination body including two or more plastic film layers and joining layers disposed therebetween.

The peel strength of not more than 250 N/m can cause peeling easily by the piercing force, thereby efficiently attenuating the piercing force. The shear strength of not more than this level can block the propagation of breakage to the next layer.

The laminate film composing the covering material of the present invention is preferably formed of plastic films including at least either one of a metal foil layer and a metal-deposited layer in order to provide high gas-barrier properties. In this case, the metal foil layer and the metal-deposited layer can be made of well-known material such as aluminum, without any material specification.

The present invention will be specifically described as follows in the form of embodiments with reference to drawings. Note that the present invention is not limited to the embodiments.

First Exemplary Embodiment

Figure 2:
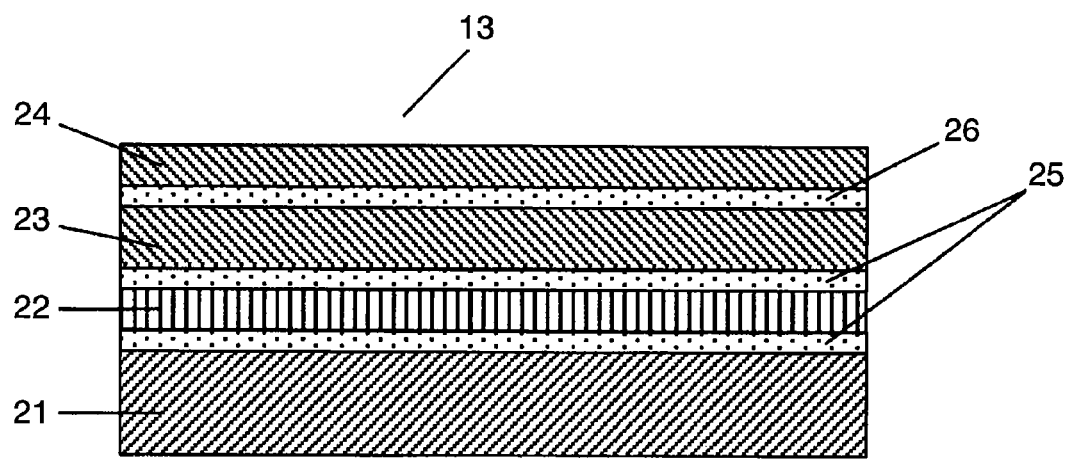
FIG. 2 is a sectional view of a covering material of the vacuum heat insulation material of the first embodiment of the present invention.

FIG. 1 is a sectional view of a vacuum heat insulation material of a first embodiment of the present invention. FIG. 2 is a sectional view of a covering material of the vacuum heat insulation material of the first embodiment of the present invention.

In FIG. 1, vacuum heat insulation material 11 is formed by inserting core material 12 and absorbent 14 into covering material 13 and then vacuuming covering material 13. More specifically, first of all, core material 12 is dried for 30 minutes in a drying furnace at 140° C. Three sides of a laminate film are heat-sealed so as to form covering material 13 into a bag shape. The dried core material 12 and absorbent 14 are inserted to covering material 13 thus formed into the bag shape, and covering material 13 is vacuumed in a vacuum chamber so as to have a pressure of not more than 13 Pa. Then, the opening is heat-sealed.

Covering material 13 used in the present first embodiment is a lamination body including sealant layer 21, metal foil 22, first plastic film layer 23, and second plastic film layer 24 which are laminated in this order from inside to outside (from the core material 12). Sealant layer 21 is formed of a 50 μm thick polyethylene film with a linear low density (hereinafter, LLDPE film). Metal foil 22 is formed of a 6 μm thick aluminum foil. First plastic film layer 23 is formed of a 12 μm thick polyethylene terephthalate film (hereinafter, PET film). Second plastic film layer 24 is formed of a 25 μm thick nylon film.

Sealant layer 21 means a heat-sealed layer.

These films have joining layers 25 and 26 disposed therebetween which are made of a urethane resin adhesive and are laminated by dry lamination in such a manner that the amount of the adhesive (solid content) is 3.5 g/m$^2$.

First adhesive layers 25 made of a well-known urethane adhesive are respectively disposed between sealant layer 21 and metal foil layer 22 and between metal foil layer 22 and first plastic film layer 23 so as to form the lamination body. The lamination body including first adhesive layer 25 has a shear strength of 1000 N/cm$^2$.

Second adhesive layer 26 made of adhesive with a low modulus of elasticity is disposed between first plastic film layer 23 and second plastic film layer 24. The lamination body including second adhesive layer 26 has a shear strength of 300 N/cm$^2$. In general, using an adhesive having a small modulus of elasticity for lamination tends to increase peel strength and decrease shear strength.

As second adhesive layer 26, DICDRY LX-500/KR-90S is used which is an aliphatic adhesive for dry lamination and manufactured by Dainippon Ink and Chemicals, Incorporated. The compounding ratio of LX-500 to KR-90S is 15:1.

Core material 12, on the other hand, is a lamination body of short glass fiber webs bonded together by physical entanglement. The glass wool having an average fiber diameter of 3.5 μm is stuck until it has a predetermined density. The glass wool is then hot-pressed for five minutes at 450° C. which is lower than the strain point of glass, thereby being formed into a board shape.

Absorbent 14 can be a water absorbent made of calcium oxide.

It has turned out that covering material 13 in vacuum heat insulation material 11 thus produced has dramatically improved pinhole resistance compared with the conventional covering materials. The measured thermal conductivity is 0.0026 W/mK.

The following is a description about the reason why the pinhole resistance can be improved.

Since the covering material has an internal pressure as low as 13 Pa, the atmospheric pressure exerts a compressive stress of about 1 kg/m$^2$ inside the covering material. When a minute foreign body contained in core material 12 pierces into covering material 13 from inside, the laminate film composing covering material 13 is mainly affected by compressive stress.

The innermost sealant layer 21 of the covering material is very soft because of being made of LLDPE, and therefore the pierced foreign body easily penetrates the layer 21. The foreign body further easily penetrates aluminum foil 22 because it is as thin as 6 μm. The foreign body also partly penetrates first plastic film 23, although first plastic film 23 does not allow foreign bodies to penetrate it very easily because of being made of PET.

When a foreign body with a blunt tip is pressed against the covering material, the covering material is mainly subjected to a tensile stress. On the other hand, when a foreign body with a sharp tip is pressed against the covering material, the covering material is mainly subjected to a compressive stress.

Pressing the pierced foreign body against first plastic film 23 causes first plastic film 23 to contract in the direction of the piercing. When first plastic film 23 is broken, the force is released outside from the foreign body and attempts to propagate to second plastic film 24.

However, first plastic film 23 and second plastic film 24 have second adhesive layer 26 with low shear strength disposed therebetween. The shear force acts on second adhesive layer 26 to break it, thereby reducing and mitigating the piercing force. As a result, the breakage of first plastic film 23 does not propagate to second plastic film 24. Thus, the covering material can be prevented from having through-pinholes.

In view of materials, second adhesive layer 26 disposed between first plastic film 23 and second plastic film 24 is made of urethane resin containing an aliphatic polyester polyol and an aliphatic polyisocyanate as the adhesive layer with low shear strength.

In general, the modulus of elasticity and shear strength of an adhesive are in a proportional relation to each other, and the shear strength decreases with decreasing modulus of elasticity. Therefore, it is thought that if the covering material is pierced by a foreign body, the adhesive layer with low shear strength is broken to reduce and mitigate the piercing force so as to block the propagation of the piercing force of the foreign body, thereby reducing the formation of pinholes in the upper films.

As described above, a high-quality vacuum heat insulation material with excellent long-term insulation performance is achieved by providing a covering material formed of a laminate film with excellent pinhole resistance and sufficient gas barrier properties as the covering material of the vacuum heat insulation material.

The vacuum heat insulation material of the present first embodiment has a thermal conductivity of 0.0026 W/mK when measured one week after the production, showing no degradation in thermal conductivity. This result reveals that none of the measured vacuum heat insulation materials have through-pinholes.

In order to have low shear strength, the joining layer is required to have a molecular structure which is linear to some extent in terms of a chemical structure of the adhesive, and therefore the isocyanate component is preferably a bifunctional or nearly bifunctional linear component.

Consequently, in order to obtain a low modulus of elasticity of the joining layer, it is particularly effective to use an aliphatic polyisocyanate such as hexamethylene-diisocyanate (HDI), trimethylhexamethylene-diisocyanate (TMDI), or lysine-diisocyanate (LDI).

It is also effective to reduce the crosslink density of the urethane resin used as the adhesive material. To achieve this reduction, the equivalent ratio of polyisocyanate to polyol is preferably not less than 1 and not more than 3 so as to make the urethane resin contain an excess of polyisocyanate. The equivalent ratio is more preferably not less than 1 and not more than 2. In other words, the isocyanate component is preferably 10 to 30 wt % less than the compounding ratio recommended by the manufacturer. Using isocyanate in this manner can reduce the modulus of elasticity of the urethane resin forming the adhesive layer, thereby reducing the shear strength.

As the shear strength of the lamination body including the joining layer is lower, the pinhole resistance can be more improved. However, when the shear strength is not less than 100 N/cm², if the covering material of the vacuum heat insulation material is strongly bent or the like, the laminate film is subjected to a load and likely to be sheared and hence peeled. Therefore, the shear strength is preferably more than 100 and not more than 300 N/cm², and more preferably more than 100 and not more than 200 N/cm².

Thus, using as the covering material the lamination body with this shear strength can provide a high-quality vacuum heat insulation material which can meet pinhole resistance and other necessary physical properties.

Figure 3:
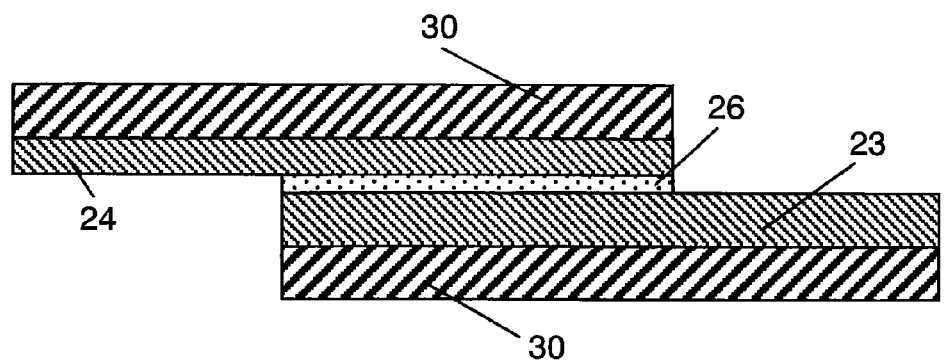
FIG. 3 is a sectional view of a shear strength test specimen of the present invention.

One approach to measuring the shear strength of the lamination body in the present invention is a measurement in accordance with JIS K6850. The specific measuring method is shown in FIG. 3. FIG. 3 shows a test specimen of the lamination body in which first plastic film 23 and second plastic film 24 are bonded together with second adhesive layer 26 with low shear strength. The test specimen is produced by bonding metal plates 30 or the like on the outermost films of the lamination body to be measured. The test specimen shown in FIG. 3 has metal plates 30 which are bonded on first plastic film 23 and on second plastic film 24, respectively. The test specimen held at both ends can be subjected to the tensile test by being pulled in the left-light direction of FIG. 3 to measure the tensile shear strength of the inner layers or the interface between the inner layers of the lamination body.

Second Exemplary Embodiment

Figure 4:
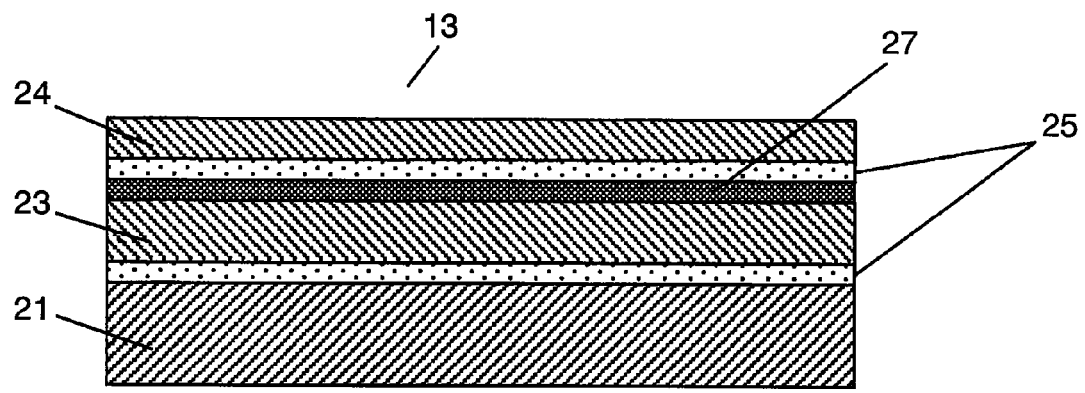
FIG. 4 is a sectional view of a covering material of a vacuum heat insulation material of a second embodiment of the present invention.

FIG. 4 is a sectional view of a covering material of a second embodiment of the present invention.

In FIG. 4, covering material 13 of the present embodiment is a lamination body including sealant layer 21 formed of a 50 μm thick LLDPE film, first plastic film layer 23 formed of a 12 μm thick PET film, and second plastic film layer 24 formed of a 25 μm thick nylon film which are laminated in this order from inside to outside.

First plastic film layer 23 includes deposited layer 27 on a side opposite to second plastic film layer 24. The deposited film is formed by depositing aluminum as thick as 500 angstroms.

Sealant layer 21 and first plastic film layer 23 have first adhesive layer 25 disposed therebetween, and first plastic film layer 23 and second plastic film layer 24 also have first adhesive layer 25 disposed therebetween. These layers are dry laminated by a well-known method. As first adhesive layers 25, a well-known urethane adhesive is used.

The vacuum heat insulation material of the present second embodiment is produced in the same manner as in the first embodiment except for the material structure of covering material 13.

In the laminate film thus produced, the lamination body consisting of sealant layer 21 and first plastic film layer 23 has a shear strength of 1000 N/cm².

On the other hand, the lamination body consisting of first plastic film layer 23 and second plastic film layer 24 has a shear strength of 250 N/cm². After the measurement of the shear strength of the lamination body, peeling is observed on the interface between first plastic film layer 23 and deposited layer 27.

It has turned out that covering material 13 in vacuum heat insulation material 11 thus produced has dramatically improved pinhole resistance compared with the conventional covering materials. The measured thermal conductivity is 0.0025 W/mK.

The reason for the improvement of the pinhole resistance is as follows. When a piercing force of a foreign body is applied, first plastic film 23 is compressed so as to be extended in the direction perpendicular to the piercing. This causes second plastic film 24 to be subjected to a stretching force from the pierced point.

However, the shear strength of the lamination body composed of first plastic film layer 23, deposited layer 27, first adhesive layer 25, and second plastic film layer 24 is as small as 250 N/cm². This small shear strength is thought to be achieved as follows. The shear force acts on deposited layer 27 so as to cause peeling on the interface between first plastic film 23 and deposited layer 27, thereby reducing and mitigating the piercing force. Therefore, the breakage of first plastic film 23 does not propagate to second plastic film 24, thereby preventing the covering material from having through-pinholes.

As described above, a high-quality vacuum heat insulation material with excellent long-term insulation performance is achieved by providing a covering material formed of a laminate film with excellent pinhole resistance and sufficient gas barrier properties as the covering material of the vacuum heat insulation material.

A decrease in the shear strength of the interface between the deposited layer and the base film layer for deposition can be achieved by using a deposited film with poor deposition quality. However, when gas barrier properties are required, they can be obtained by precoating the surface of the deposited layer with resin which has a good adhesion with the deposited film.

The resin which has a good adhesion with the deposited film can be selected from well-known adhesive materials. For example, in the case where the deposited film is aluminum, it is effective to coat resin made of a mixture of a polyacrylic acid copolymer and a polyalcohol polymer.

It is more preferable to heat-treat the coated mixture at around 200° C. so as to increase the adhesion between the deposited film and the coating material, and to reduce the bonding strength between the base film and the deposited film due to the thermal expansion of the base film.

In the present second embodiment, the deposited layer is formed of an aluminum deposited layer; however, a ceramic-deposited layer can be alternatively used to obtain the same results.

Third Exemplary Embodiment

Figure 5:
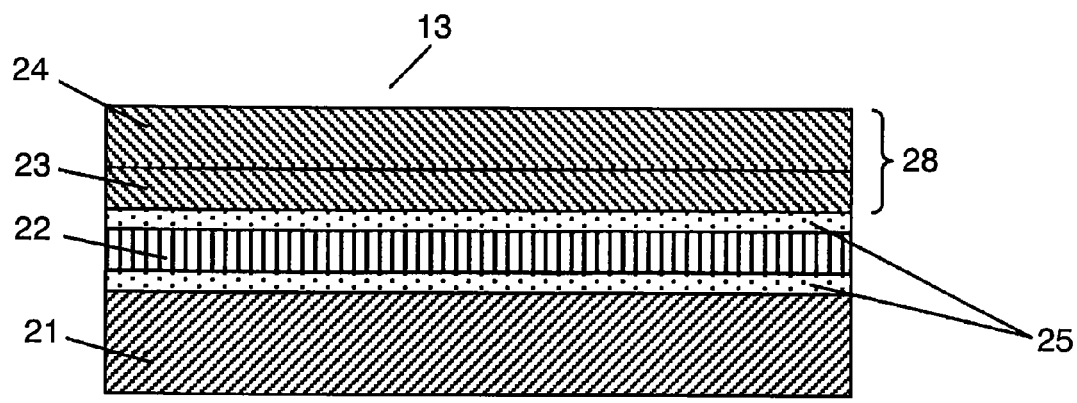
FIG. 5 is a sectional view of a covering material of a vacuum heat insulation material of a third embodiment of the present invention.

FIG. 5 is a sectional view of a covering material of a third embodiment.

In FIG. 5, covering material 13 is a lamination body including sealant layer 21 formed of a 50 μm thick LLDPE film, metal foil layer 22 formed of a 6 μm thick aluminum foil, first plastic film layer 23 formed of a 15 μm thick nylon film, and second plastic film layer 24 formed of a 25 μm thick nylon film which are laminated in this order from inside to outside.

First plastic film layer 23 and second plastic film layer 24 are formed as coextruded film layers 28 which are laminated by coextrusion.

Sealant layer 21 and metal foil layer 22 are bonded to each other with first adhesive layer 25 disposed therebetween, and metal foil layer 22 and first plastic film layer 23 are bonded to each other also with first adhesive layer 25 disposed therebetween. First adhesive layers 25 are made of a well-known urethane adhesive.

The vacuum heat insulation material of the present embodiment is produced in the same manner as in the first embodiment except for the material structure of covering material 13.

In the laminate film thus produced, the lamination body consisting of sealant layer 21, metal foil layer 22, first plastic film layer 23, and first adhesive layer 25 has a shear strength of 1000 N/cm².

On the other hand, the lamination body consisting of first plastic film layer 23 and second plastic film layer 24 has a shear strength of 150 N/cm². After the measurement of the shear strength of the lamination body, peeling is observed on the interface between first plastic film layer 23 and second plastic film layer 24.

It has turned out that covering material 13 in vacuum heat insulation material 11 thus produced has dramatically improved pinhole resistance compared with the conventional covering materials. The measured thermal conductivity is 0.0025 W/mK.

The reason for the improvement of the pinhole resistance is as follows. When a pierced foreign body is pressed against first plastic film 23, first plastic film 23 is compressed in the direction of the piercing. When first plastic film 23 is broken, the force is released outside from the pierced point and attempts to propagate to second plastic film 24.

However, the lamination body consisting of first plastic film 23 and second plastic film 24 has a shear strength as low as 150 N/cm². This small shear strength is thought to be achieved as follows. The shear force acts on first plastic film 23 so as to cause peeling on the interface between first plastic film 23 and second plastic film layer 24, thereby reducing and mitigating the piercing force. Therefore, the breakage of first plastic film 23 does not propagate to second plastic film 24, thereby preventing the covering material from having through-pinholes.

As described above, a high-quality vacuum heat insulation material with excellent long-term insulation performance is achieved by providing a covering material formed of a laminate film with excellent pinhole resistance and sufficient gas barrier properties as the covering material of the vacuum heat insulation material.

Fourth Exemplary Embodiment

Figure 6:
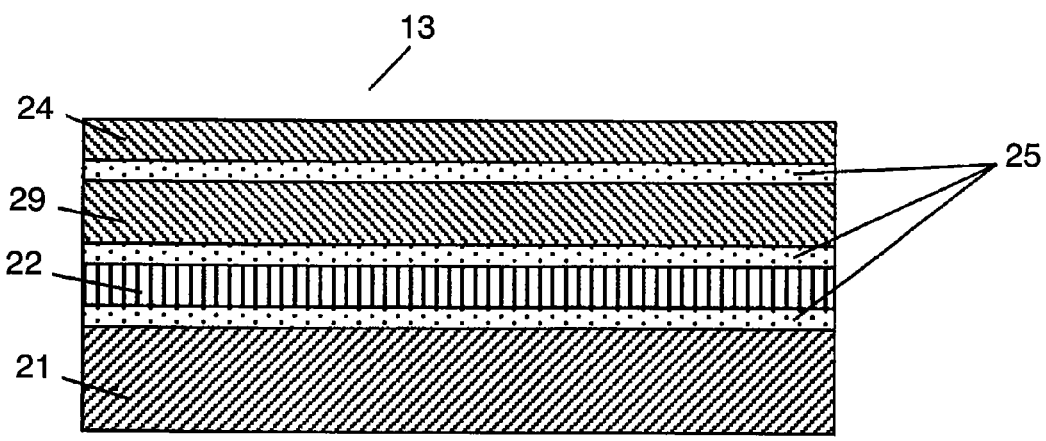
FIG. 6 is a sectional view of a covering material of a vacuum heat insulation material of a fourth embodiment of the present invention.

FIG. 6 is a sectional view of a covering material of a vacuum heat insulation material of a fourth embodiment of the present invention.

In FIG. 6, covering material 13 is a lamination body including sealant layer 21 formed of a 50 μm thick LLDPE film, metal foil 22 formed of a 6 μm thick aluminum foil, first plastic film layer 29 formed of a 12 μm thick ethylene-vinyl-alcohol copolymer resin, and second plastic film layer 24 formed of a 25 μm thick nylon film which are laminated in this order from inside to outside.

Sealant layer 21 and metal foil 22 are bonded to each other with first adhesive layer 25 disposed therebetween. Similarly, metal foil 22 and first plastic film layer 29 are bonded to each other with first adhesive layer 25 therebetween, and first plastic film layer 29 and second plastic film layer 24 are bonded to each other with first adhesive layer 25 therebetween. These layers are dry laminated by a well-known method using a well-known urethane adhesive as first adhesive layers 25, thereby forming covering material 13.

On the other hand, first plastic film layer 29 is formed of the ethylene-vinyl-alcohol copolymer resin film (12 μm), and this resin is used as a plastic film layer with a low shear strength interface.

The vacuum heat insulation material of the present embodiment is produced in the same manner as in the first embodiment except for the material structure of covering material 13.

In the laminate film thus produced, the lamination body including first plastic film layer 29 has a shear strength of 300 N/cm². After the measurement of the shear strength of the lamination body, peeling is observed on the interface of first plastic film layer 29, and breakage is observed in first plastic film layer 29.

It has turned out that covering material 13 in vacuum heat insulation material 11 thus produced has dramatically improved pinhole resistance compared with the conventional covering materials. The measured thermal conductivity is 0.0025 W/mK.

The mechanism to improve the pinhole resistance is the same as described above. A layer with low shear strength is broken by a shear force caused by a piercing force from inside the lamination body. This reduces and mitigates the piercing force to block the propagation of the breakage, thereby preventing the lamination body from having through-pinholes.

In the present embodiment, first plastic film 29 is considered to function as the plastic film layer with low shear strength.

The plastic film with low shear strength is not limited to an ethylene-vinyl-alcohol copolymer resin film and can be a nylon film, a polyethylene terephthalate film, a polypropylene film, a polyethylene film, or the like.

As described above, a high-quality vacuum heat insulation material with excellent long-term insulation performance is achieved by providing a covering material formed of a laminate film with excellent pinhole resistance and sufficient gas barrier properties as the covering material of the vacuum heat insulation material.

Fifth Exemplary Embodiment

Figure 7:
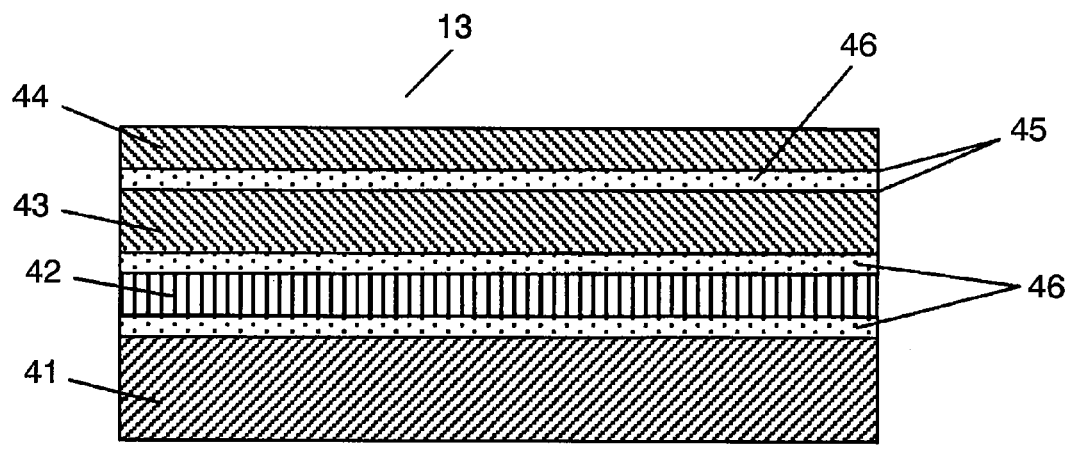
FIG. 7 is a sectional view of a covering material of a vacuum heat insulation material of a fifth embodiment of the present invention.

FIG. 7 is a sectional view of a covering material of a fifth embodiment of the present invention.

As shown in FIG. 7, covering material 13 of the present embodiment is a lamination body including sealant layer 41 formed of a 50 μm thick LLDPE film, metal foil 42 formed of a 6 μm thick aluminum foil, first plastic film layer 43 formed of a 12 μm thick PET film, and second plastic film layer 44 formed of a 25 μm thick nylon film which are laminated in this order from inside to outside.

This laminate film includes low peel strength interfaces 45 between first plastic film layer 43 and adhesive layer 46 and between second plastic film layer 44 and adhesive layer 46, respectively.

The vacuum heat insulation material of the present embodiment is produced in the same manner as in the first embodiment except for the material structure of covering material 13.

Sealant layer 41 and metal foil 42 are bonded to each other, and metal foil 42 and first plastic film layer 43 are also bonded to each other by well-known dry lamination using a well-known urethane adhesive so as to have a peel strength of not less than 700 N/m.

Low peel strength interfaces 45 are formed by making adhesive layer 46 between first plastic film 43 and second plastic film 44 in a grid pattern. The adhesive is applied in the grid pattern in such a manner as to occupy about 1/10 of the entire adhesive surface, thereby reducing the adhesive strength between first plastic film 43 and second plastic film 44. The peel strength is 150 N/m.

It has turned out that covering material 13 in vacuum heat insulation material 11 thus produced has dramatically improved pinhole resistance compared with the conventional covering materials. The measured thermal conductivity is 0.0026 W/mK.

The mechanism to improve the pinhole resistance in the present fifth embodiment will be described as follows. When a minute foreign body contained in core material 12 pierces into covering material 13 from inside, the laminate film composing covering material 13 is mainly affected by compressive stress. When the pierced foreign body is pressed against first plastic film 43, first plastic film 43 is compressed in the direction of the piercing. When first plastic film 43 is broken, the force is released outside from the pierced point and attempts to propagate to second plastic film 44.

However, first plastic film 43 and second plastic film 44 have low peel strength interface 45 disposed therebetween. When the low peel strength interface is subjected to compressive stress, the interface is peeled to reduce and mitigate the piercing stress. This prevents the breakage of first plastic film 43 from propagating to second plastic film 44, thereby preventing the covering material from having through-pinholes.

In the present embodiment, the adhesive is applied in the grid pattern in such a manner as to occupy about 1/10 of the entire adhesive surface, thereby reducing the adhesive strength and forming the interface with the low peel strength. Besides controlling the size of the adhesive surface, the adhesive strength of the adhesive can be controlled to form the interface with the low peel strength.

As the peel strength of the lamination body including the adhesive layer is lower, the pinhole resistance can be more improved. However, when the peel strength is less than 20 N/m, if the covering material of the vacuum heat insulation material is strongly bent or the like, the laminate film is subjected to a load and likely to be sheared and hence peeled. Therefore, the peel strength is preferably not less than 20 and not more than 200 N/m, and more preferably not less than 20 and not more than 100 N/m.

Thus, using the covering material with this peel strength can provide a high-quality vacuum heat insulation material which can meet pinhole resistance and other necessary physical properties.

Adhesive layer 46 in the present fifth embodiment may have a structure other than the grid pattern as long as the adhesive can be applied almost uniformly on the entire surface. For example, it can be a honeycomb shape or a dot shape.

Sixth Exemplary Embodiment

Figure 8:
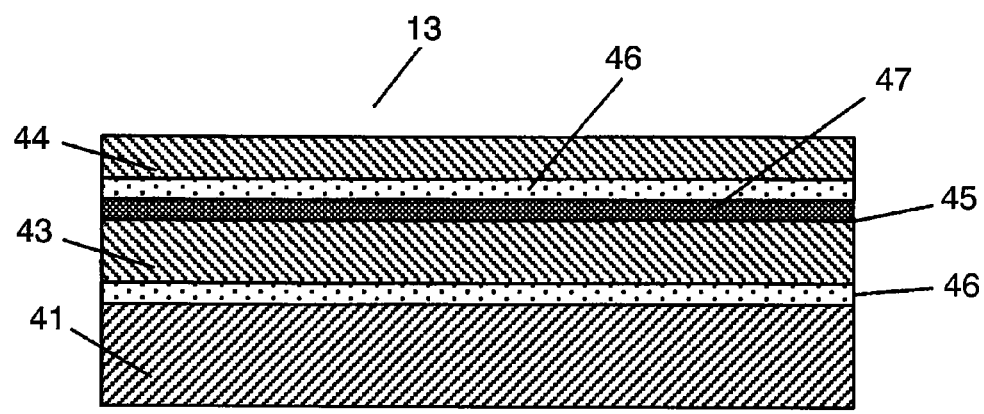
FIG. 8 is a sectional view of a covering material of a vacuum heat insulation material of a sixth embodiment of the present invention.

FIG. 8 is a sectional view of a covering material of a sixth embodiment.

In FIG. 8, covering material 13 is a lamination body including sealant layer 41 formed of a 50 μm thick LLDPE film, first plastic film layer 43 formed of a 12 μm thick PET film, and second plastic film layer 44 formed of a 25 μm thick nylon film which are laminated in this order from inside to outside.

First plastic film layer 43 includes deposited layer 47 on a side opposite to second plastic film layer 44. Deposited layer 47 is formed by depositing aluminum as thick as 500 angstroms. Deposited layer 47 and first plastic film layer 43 have low peel strength interface 45 disposed therebetween.

The vacuum heat insulation material of the present embodiment is produced in the same manner as in the first embodiment except for the material structure of covering material 13.

Sealant layer 41 and first plastic film layer 43 are bonded to each other, and first plastic film layer 43 and second plastic film layer 44 are also bonded to each other by well-known dry lamination using a well-known urethane adhesive so as to have a peel strength of not less than 700 N/m.

On the other hand, first plastic film 43 and deposited layer 47 are bonded to each other with low peel strength interface 45 disposed therebetween so as to have a peel strength of 200 N/m.

It has turned out that covering material 13 in vacuum heat insulation material 11 thus produced has dramatically improved pinhole resistance compared with the conventional covering materials. The measured thermal conductivity is 0.0025 W/mK.

The mechanism to thus improve the pinhole resistance will be described as follows. When a minute foreign body contained in core material 12 pierces into covering material 13 from inside, covering material 13 is mainly affected by compressive stress. When the pierced foreign body is pressed against first plastic film 43, first plastic film 43 is compressed in the direction of the piercing. When first plastic film 43 is broken, the force is released outside from the pierced point and attempts to propagate to deposited layer 47.

However, first plastic film 43 and deposited layer 47 have low peel strength interface 45 disposed therebetween. When the low peel strength interface is subjected to compressive stress, the interface is peeled to reduce and mitigate the piercing force. This prevents the breakage of first plastic film 43 from propagating to second plastic film 44.

As a result, the covering material can be prevented from having through-pinholes.

A decrease in the shear strength of the interface between the deposited layer and the base film layer for deposition can be achieved by using a deposited film with poor deposition quality. When gas barrier properties are required, they can be obtained by precoating the surface of the deposited layer with resin which has a good adhesion with the deposited film.

The resin which has a good adhesion with the deposited film can be selected from well-known materials such as urethane resin. For example, in the case where the deposited film is aluminum, it is effective to coat resin made of a mixture of a polyacrylic acid copolymer and a polyalcohol polymer. The polyacrylic acid copolymer can be replaced by a polymethacrylic acid copolymer.

It is more preferable to heat-treat the coated mixture at around 200° C. so as to further increase the adhesion between the deposited film and the coating material, and to reduce the bonding strength between the base film and the deposited film due to the thermal expansion of the base film.

Seventh Exemplary Embodiment

Figure 9:
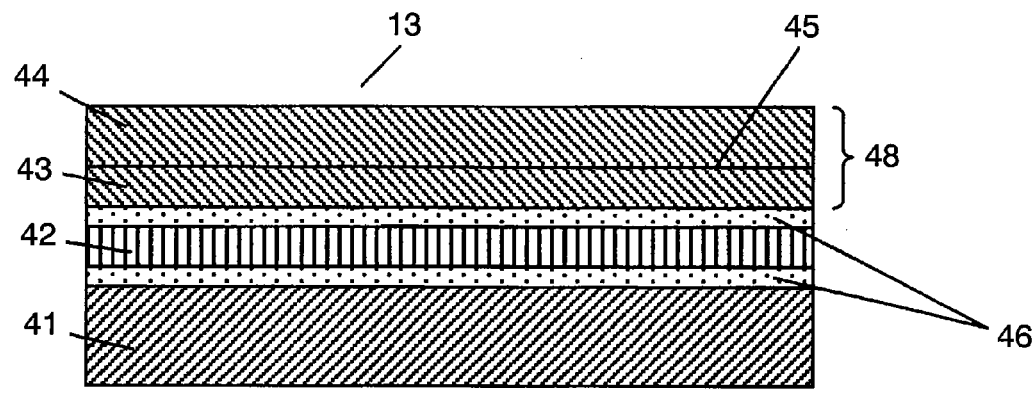
FIG. 9 is a sectional view of a covering material of a vacuum heat insulation material of a seventh embodiment of the present invention.

FIG. 9 is a sectional view of a covering material of a seventh embodiment.

In FIG. 9, covering material 13 is a lamination body including sealant layer 41 formed of a 50 μm thick LLDPE film, metal foil layer 42 formed of a 6 μm thick aluminum foil, first plastic film layer 43 formed of a 25 μm thick nylon film, and second plastic film layer 44 formed of a 15 μm thick nylon film which are laminated in this order from inside to outside.

First plastic film layer 43 and second plastic film layer 44 are formed as coextruded films layers 48 which are laminated by coextrusion.

In the present seventh embodiment, first plastic film layer 43 and second plastic film layer 44 have low peel strength interface 45 disposed therebetween.

The vacuum heat insulation material of the present embodiment is produced in the same manner as in the first embodiment except for the material structure of covering material 13.

Sealant layer 41 and metal foil 42 are bonded to each other, and metal foil 42 and first plastic film layer 43 are also bonded to each other by well-known dry lamination using a well-known urethane adhesive so as to have a peel strength of not less than 700 N/m.

On the contrary, the peel strength of the low peel strength interface 45 was 100 N/m.

It has turned out that covering material 13 in vacuum heat insulation material 11 thus produced has dramatically improved pinhole resistance compared with the conventional covering materials. The measured thermal conductivity is 0.0025 W/mK.

The mechanism to thus improve the pinhole resistance will be described as follows. When a minute foreign body contained in core material 12 pierces into covering material 13 from inside, the laminate film composing covering material 13 is mainly affected by compressive stress. When the pierced foreign body is pressed against first plastic film 43, first plastic film 43 is compressed in the direction of the piercing. When first plastic film 43 is broken, the force is released outside from the pierced point and attempts to propagate to second plastic film 44.

However, first plastic film 43 and second plastic film 44 have low peel strength interface 45 disposed therebetween. When the low peel strength interface is subjected to piercing stress, the interface is peeled to reduce and mitigate the piercing force. This prevents the breakage of first plastic film 43 from propagating to second plastic film 44.

As a result, the covering material can be prevented from having through-pinholes.

Eighth Exemplary Embodiment

Figure 10:
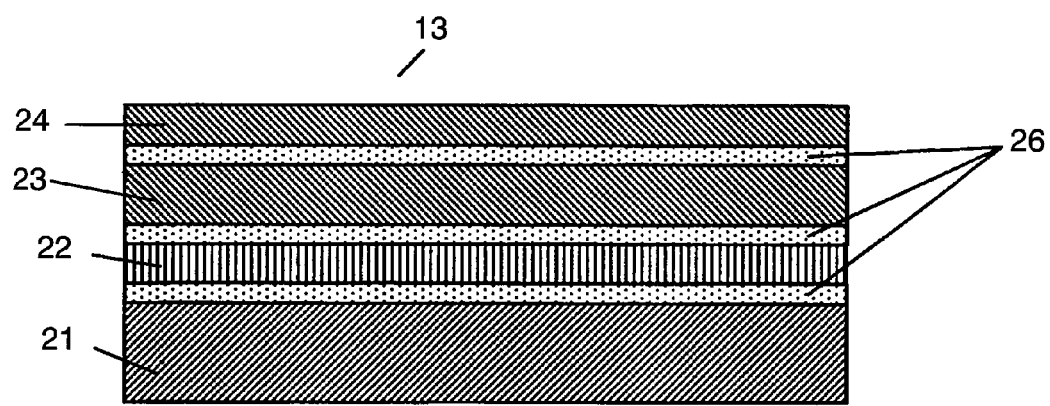
FIG. 10 is a sectional view of a covering material of a vacuum heat insulation material of an eighth embodiment of the present invention.

FIG. 10 is a sectional view of a covering material of a vacuum heat insulation material of an eighth embodiment of the present invention.

Vacuum heat insulation material 11 is produced in the same manner as in the first embodiment.

Covering material 13 is a lamination body including sealant layer 21 formed of a 50 μm thick LLDPE film, metal foil 22 formed of a 6 μm thick aluminum foil, first plastic film layer 23 formed of a 25 μm thick nylon film, and second plastic film layer 24 formed of a 15 μm thick nylon film which are laminated in this order from inside to outside. Each of the interlayers of the lamination body is formed of joining layer 26 made of urethane resin.

The lamination body is produced by dry lamination in such a manner that the amount of the adhesive (solid content) of each joining layer 26 is 3.5 g/m².

As the urethane resin of joining layers 26, DICDRY LX-500/KR-90S is used which is an aliphatic adhesive for dry lamination and manufactured by Dainippon Ink and Chemicals, Incorporated. The compounding ratio of LX-500 to KR-90S is 15:1.

The vacuum heat insulation material of the present eighth embodiment is produced in the same manner as in the first embodiment except for the material structure of covering material 13.

It has turned out that the covering material in the vacuum heat insulation material thus produced has dramatically improved pinhole resistance compared with the conventional covering materials.

The urethane resin adhesive composing the joining layer has a low modulus of elasticity and appropriate flexibility because of being made of an aliphatic polyester polyol and an aliphatic polyisocyanate. Therefore, it is thought that if the urethane resin has a lower modulus of elasticity than the adherend to which the urethane resin is applied and a force acts in the direction for a foreign body inside to pierce the covering material, the joining layer absorbs the distortion to prevent the piercing from causing pinholes.

Furthermore, the modulus of elasticity and shear strength of an adhesive are in a proportional relation to each other, and the shear strength generally decreases with decreasing modulus of elasticity. Therefore, when a foreign body pierces into the sealant layer, the foreign body penetrates the sealant layer and then breaks the joining layer with low shear strength. It is thought that this breakage reduces the piercing force of the foreign body and blocks the propagation of the piercing force, thereby reducing the formation of pinholes in the upper films.

Ninth Exemplary Embodiment

Figure 11:
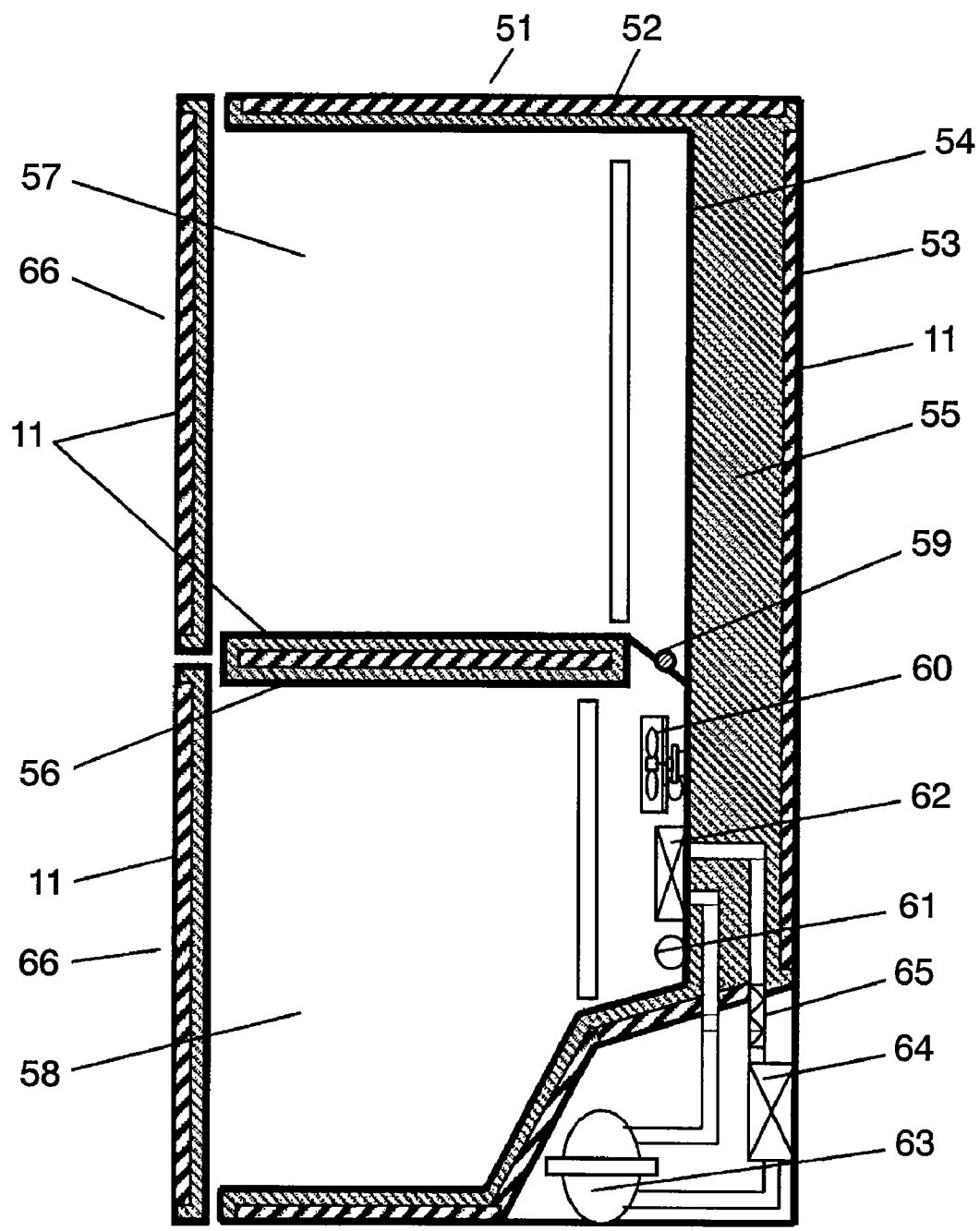
FIG. 11 is a sectional view of a fridge-freezer of a ninth embodiment of the present invention.
Figure 12:
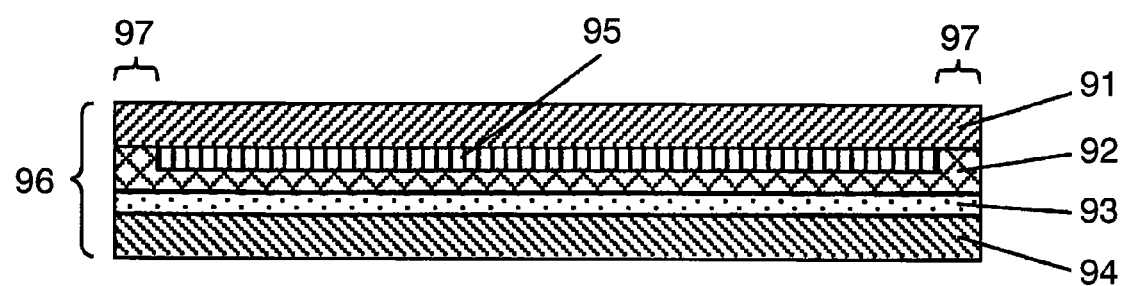
FIG. 12 is a sectional view of a conventional impact resistant packaging material.

FIG. 11 is a sectional view of a fridge-freezer using the vacuum heat insulation material of the eighth embodiment of the present invention. The fridge-freezer will be described as follows as an example of the cold reserving apparatus of the present invention.

As shown in FIG. 11, refrigerator 51 is composed of a refrigeration cycle and insulating box 52 forming the chassis of the refrigerator. Insulating box 52 includes outer case 53 and inner case 54 connected to each other by a flange (unillustrated). Outer case 53 is formed of a press-molded iron sheet, and inner case 54 is made of ABS resin or the like. Insulating box 52 contains vacuum heat insulation material 11, and the remaining space in insulating box 52 is filled with rigid urethane foam (rigid resin foam) 55. Rigid urethane foam 55 is made using cyclopentane as a foaming agent.

Insulating box 52 is partitioned by partition board 56 into refrigerating chamber 57 in the upper part and freezing chamber 58 in the lower part. Partition board 56 is provided with motorized damper 59. Inner case 54 in freezing chamber 58 is provided with cooling fan motor 60 and defrost heater 61.

On the other hand, the refrigeration cycle is composed of evaporator 62, compressor 63, condenser 64, capillary tube 65, and the like which are connected in a circle. Alternatively, it is possible to provide two evaporators 62, one in refrigerating chamber 57 and the other in freezing chamber 58 and to connect them either in series or in parallel in the refrigeration cycle.

Refrigerator 51 is equipped with door body 66, which contains vacuum heat insulation material 11 and the remaining space in door body 66 is filled with rigid urethane foam 55.

Vacuum heat insulation material 11 can be made of the vacuum heat insulation material of the eighth embodiment.

In general, plastic, which is a polymer compound, tends to become less flexible, harder, and more fragile and also to increase its modulus of elasticity with decreasing temperature. However, the urethane resin of joining layers 26 of the covering material composing vacuum heat insulation material 11 used in refrigerator 51 inherently has a low modulus of elasticity and therefore can maintain sufficient flexibility when used in a temperature range not more than the normal temperature.

Therefore, when the vacuum heat insulation material is used in a temperature range between the normal temperature and about −18° C., which is the temperature inside the refrigerator, the urethane resin adhesive composing the joining layers has a lower modulus of elasticity than the adherend to which the urethane resin adhesive is applied. Therefore, even when a force acts in the direction for a foreign body inside to pierce the covering material of the laminated structure, the joining layers absorb the distortion to prevent the piercing from causing pinholes.

As a result, the vacuum heat insulation material of the present embodiment can maintain its quality for a long time, and the refrigerator of the present embodiment using this vacuum heat insulation material can maintain the ability to reduce consumption power for a long time.

In terms of maintaining the level of modulus of elasticity, the urethane resin of joining layers 26 of the covering material may preferably has a glass transition point of not more than the temperature range in which the vacuum heat insulation material is used.

The urethane resin of the joining layers of the covering material will be specifically described as follows in some examples and comparative examples. Note that the present invention is not limited to these examples.

Vacuum heat insulation materials are formed using different adhesives during dry lamination and the pinhole resistance of these vacuum heat insulation materials is shown in Table 1 as first to fourth examples and comparative examples A to D.

TABLE 1

| | | Example | | | | Comparative example | | | |
|---|---|---|---|---|---|---|---|---|---|
| | | 1 | 2 | 3 | 4 | A | B | C | D |
| Physical properties of adhesive | Comparison of modulus of elasticity | small | small | small | small | small | small | large | large |
| | Surface hardness 20° C. | 40 | 40 | 45 | 45 | 50 | 45 | 65 | 68 |
| | 0° C. | 40 | 40 | 46 | 46 | 55 | 46 | 75 | 80 |
| Physical properties of vacuum heat insulation material | thermal conductivity (W/mK) | 0.002 | 0.002 | 0.002 | 0.002 | 0.002 | 0.002 | 0.002 | 0.002 |
| | pinhole resistance | good | good | good | good | poor | good | poor | poor |
| | Presence or absence of peeling | no | no | no | no | no | peeled | no | no |

Vacuum heat insulation material 11 is produced basically in the same manner as in the eighth embodiment except for the material of joining layers 26 of covering material 13 composing vacuum heat insulation material 11. Furthermore, in order to check the pinhole resistance of vacuum heat insulation material 11, covering material 13 is vacuum sealed with a defined amount of glass shot having a predetermined particle diameter prepared on the core material surface. The vacuum heat insulation material is evaluated for the presence or absence of leakage after vacuum sealing covering material 13 and for the presence or absence of peeling of the covering material when subjected to a bending test.

Table 1 also shows the physical properties of the urethane resin forming joining layers 26. A comparison of the modulus of elasticity is made between the urethane resin of joining layers 26 and adherends such as films. Surface hardness is measured at 20° C. and 0° C. with a rubber hardness tester by producing the bulk of the urethane resin. The surface hardness is evaluated as the alternative physical properties of the modulus of elasticity, which can be tensile modulus of elasticity, compressive modulus of elasticity, or the like.

As vacuum heat insulation material 11, the vacuum heat insulation materials shown in the first to seventh embodiments can be used instead of the one shown in the eighth embodiment.

First Example

Joining layers 26 shown in FIG. 10 are made of urethane resin containing an aliphatic polyester polyol and a modified hexamethylene-diisocyanate (HDI), which is an aliphatic polyisocyanate.

In this example, the urethane resin of joining layers 26 has a lower modulus of elasticity than each film forming covering material 13, and has a surface hardness as low as 40 at 20° C. which is the same as at 0° C.

The vacuum heat insulation material of this example has no problems such as the formation of pinholes or peeling of the covering material.

The aliphatic polyisocyanate can be selected from well-known materials and can preferably be a hexamethylene-diisocyanate (HDI), a trimethylhexamethylene-diisocyanate (TMDI), a lysine-diisocyanate (LDI), or the like and can more preferably be a modified one of these diisocyanates.

The aliphatic polyester polyol can also be selected from well-known materials.

Second Example

Joining layers 26 shown in FIG. 10 are made of urethane resin containing an aliphatic polyester polyol and a modified isophorone diisocyanate (IPDI), which is an alicyclic isocyanate. The compounding ratio of polyol to polyisocyanate is 2 in terms of the equivalent ratio, indicating that the urethane resin contains an excess of polyisocyanate.

In this example, the urethane resin of joining layers 26 has a lower modulus of elasticity than each film forming covering material 13, and has a surface hardness as low as 40 at 20° C. which is the same as at 0° C.

The vacuum heat insulation material of this example has no problems such as the formation of pinholes or peeling of the covering material.

When the aliphatic isocyanate cannot be used, it is effective to use an alicyclic isocyanate. In this case, the equivalent ratio of polyisocyanate to polyol is preferably not less than 1 and not more than 3 so as to make the urethane resin contain an excess of polyisocyanate.

The alicyclic isocyanate can be selected from well-known materials such as a dicyclohexylmethane diisocyanate (HMDI), an isophorone diisocyanate (IPDI), and a 1.4-cyclohexane diisocyanate (CHDI).

The equivalent ratio of polyisocyanate to polyol is preferably not less than 1 and not more than 3 so as to make the urethane resin contain an excess of polyisocyanate. The equivalent ratio is more preferably not less than 1 and not more than 2. In order to determine the equivalent ratio of urethane resin in the form of joining layers 26, it is, for example, possible to measure an infrared absorption spectrum so as to compare absorption intensity caused by polyisocyanate.

Third Example

Joining layers 26 are made of urethane resin containing an aliphatic polyester polyol and a modified dicyclohexyl-methane diisocyanate (HMDI), which is an alicyclic isocyanate. The compounding ratio of polyol to polyisocyanate is 2 in terms of the equivalent ratio, indicating that the urethane resin contains an excess of polyisocyanate.

In this example, the urethane resin of joining layers 26 has a lower modulus of elasticity than each film forming covering material 13 and has a surface hardness of 45 (20° C.) and 46 (0° C.).

The vacuum heat insulation material of this example has no problems such as the formation of pinholes or peeling of the covering material.

Fourth Example

Joining layer 26 is made of urethane resin containing an aliphatic polyester polyol and a prepolymer of a tolylene diisocyanate (TDI). The compounding ratio of polyol to polyisocyanate is 2 in terms of the equivalent ratio, indicating that the urethane resin contains an excess of polyisocyanate.

In this example, the urethane resin of joining layers 26 has a lower modulus of elasticity than each film forming covering material 13 and has a surface hardness of 45 (20° C.) and 46 (0° C.).

The vacuum heat insulation material of this example has no problems such as the formation of pinholes or peeling of the covering material.

Comparative Example "A"

Joining layers 26 are made of urethane resin containing an aliphatic polyester polyol and a prepolymer of tolylene diisocyanate (TDI). The compounding ratio of polyol to polyisocyanate is 3.2 in terms of the equivalent ratio, indicating that the urethane resin contains an excess of polyisocyanate.

In this example, the urethane resin of joining layers 26 has a lower modulus of elasticity than each film forming covering material 13 and has a surface hardness of 50 at 20° C., which is higher than those of the urethane resins of the examples. The surface hardness of the urethane resin of this example differs by 5 between at 20° C. and at 0° C.

The vacuum heat insulation material in this example causes no peeling of the covering material, but causes a lot of pinholes which result in the breakage of the covering material.

It is thought that when the equivalent ratio of polyol to polyisocyanate exceeds 3, the urethane resin has an increased degree of crosslinking and loses its elasticity.

Comparative Example "B"

Joining layers 26 are made of urethane resin containing an aliphatic polyester polyol and a prepolymer of tolylene diisocyanate (TDI). The compounding ratio of polyol to polyisocyanate is 0.9 in terms of the equivalent ratio, indicating that the urethane resin contains less polyisocyanate.

In this example, the urethane resin of joining layers 26 has a lower modulus of elasticity than each film forming covering material 13 and has a surface hardness of 45, which is the equivalent level of the urethane resins of the examples. The surface hardness of the urethane resin of this example differs by 1 between at 20° C. and at 0° C.

In the vacuum heat insulation material of this example, no pinholes are observed but peeling is observed in a part of the interlayers of the covering material when the vacuum heat insulation material is subjected to a bending test.

Comparative Example "C"

Joining layers 26 are made of urethane resin containing an aliphatic polyester polyol and a tolylene diisocyanate (TDI).

In this example, the urethane resin of joining layers 26 has a lower modulus of elasticity than each film forming covering material 13 and has a surface hardness of 65 at 20° C., which is higher than those of the urethane resins of the examples The surface hardness of the urethane resin of this example differs by 10 between at 20° C. and at 0° C.

The vacuum heat insulation material in this example causes no peeling of the covering material, but causes a lot of pinholes which result in the breakage of the covering material.

Comparative Example "D"

Joining layers 26 are made of urethane resin containing an aromatic polyester polyol and a tolylene diisocyanate (TDI).

In this example, the urethane resin of joining layers 26 has a lower modulus of elasticity than each film forming covering material 13 and has a surface hardness of 68 at 20° C., which is higher than those of the urethane resins of the examples. The surface hardness of the urethane resin of this example differs by 12 between at 20° C. and at 0° C.

The vacuum heat insulation material in this example causes no peeling of the covering material, but causes a lot of pinholes which result in the breakage of the covering material.

The term "low peel strength interface" of the lamination body of the present invention refers to an interface with low tensile shear force when the tensile shear force is measured in accordance with JIS K6850 or an interface with low peel strength when the peel strength is measured in accordance JIS K6854.

INDUSTRIAL APPLICABILITY

As described hereinbefore, the vacuum heat insulation material of the present invention is excellent in pinhole resistance and long-term insulation performance.

These advantages enable the vacuum heat insulation material to be used with no problems in fridge-freezers, housing, household appliances, and the like which are required to have long-term insulation performance. Furthermore, the excellent gas barrier properties allow the vacuum heat insulation material to be effectively used for heat shielding in information devices such as printers, copying machines, liquid crystal projectors, notebook personal computers.

Furthermore, the excellent pinhole resistance allows the vacuum heat insulation material to be dramatically improved in processability such as bending, forming into a cylindrical shape, or surface compression molding. This results in an improvement in application performance, allowing the vacuum heat insulation material to be used in a wider field of applications.

In addition, the vacuum heat insulation material of the present invention exhibits a small decrease in pinhole resistance when used in low temperatures, and provides a stable quality in a device used in a temperature range not more than the normal temperature, thereby providing a high-quality cold reserving apparatus.

The invention claimed is:

1. A vacuum heat insulation material comprising at least a core material and a covering material, the covering material covering the core material and being vacuum sealed, wherein
the covering material is a lamination body including at least two plastic film layers, one of a metal layer and a ceramic-deposited layer, and adhesive layers for joining therebetween, and
the lamination body has a stress-relieving structure in inner layers thereof, the stress-relieving structure being able to prevent penetration and propagation of breakage in a direction perpendicular to the lamination body.

2. The vacuum heat insulation material of claim 1, wherein
in a condition where glass shot is placed on the core material and the covering material is vacuumed to a pressure not more than 13 Pa,
when the glass shot pierces and breaks a first plastic film, the stress-relieving structure can block breakage of the first plastic film from propagating to a second plastic film outwardly adjacent to the first plastic film in the inner layers of the lamination body.

3. The vacuum heat insulation material of claim 1, wherein
when the lamination body is subjected to a compressive stress in the direction perpendicular thereto, one of interfaces of the lamination body is peeled.

4. The vacuum heat insulation material of claim 3, wherein the interface to be peeled is an interface between one of the adhesive layers and another layer.

5. The vacuum heat insulation material of claim 3, wherein the metal layer is a deposited metal layer, and the interface to be peeled is an interface between the deposited metal layer and another layer.

6. The vacuum heat insulation material of claim 3, wherein the plastic film layers include coextruded multilayer films, and the interface to be peeled is an interface in the coextruded films.

7. The vacuum heat insulation material of claim 3, wherein the lamination body has an interface with a shear strength of 100 to 300 N/cm$^2$.

8. The vacuum heat insulation material of claim 3, wherein the metal layer is a deposited metal layer, and an interface between the deposited metal layer and another layer has a shear strength of 100 to 300 N/cm$^2$.

9. The vacuum heat insulation material of claim 3, wherein the plastic film layers include coextruded multilayer films and an interface in the coextruded films has a shear strength of 100 to 300 N/cm$^2$.

10. The vacuum heat insulation material of claim 3, wherein
one of the adhesive layers is formed in a grid pattern.

11. The vacuum heat insulation material of claim 3, wherein
the lamination body has an interface with a peel strength of 20 to 200 N/m.

12. The vacuum heat insulation material of claim 3, wherein
the plastic film layers include coextruded multilayer films, and an interface in the coextruded films has a peel strength of 20 to 200 N/m.

13. The vacuum heat insulation material of claim 3, wherein
the metal layer is a deposited metal layer, and an interface between the deposited metal layer and another layer has a peel strength of 20 to 200 N/m.

14. The vacuum heat insulation material of claim 1, wherein
when the lamination body is subjected to a compressive stress in the direction perpendicular thereto, one of the plastic films or one of the joining layers is broken.

15. The vacuum heat insulation material of claim 14, wherein
the one of the plastic films or the one of the joining layers has a shear strength of 100 to 300 N/cm$^2$.

16. The vacuum heat insulation material of claim 14, wherein
the one of the joining layers is lower in modulus of elasticity than the plastic films.

17. The vacuum heat insulation material of claim 15, wherein
the one of the joining layers is made of urethane resin.

18. The vacuum heat insulation material of claim 17, wherein
the urethane resin contains a polyisocyanate and a polyester polyol, and an equivalent ratio of polyisocyanate to polyester polyol is not less than 1 and not more than 3.

19. The vacuum heat insulation material of claim 1, wherein
at least one of the joining layers is made of urethane resin containing a polyisocyanate and a polyester polyol, and
an equivalent ratio of polyisocyanate to polyester polyol is not less than 1 and not more than 3.

20. The vacuum heat insulation material of claim 1, wherein
at least one of the joining layers is made of urethane resin containing an aliphatic polyisocyanate.

21. The vacuum heat insulation material of claim 1, wherein
at least one of the joining layers is made of urethane resin containing an aliphatic polyester polyol and an aliphatic polyisocyanate.

22. A cold reserving apparatus used in a temperature range not more than a normal temperature,
the cold reserving apparatus comprising an insulating box and an insulating door body, and
in at least one of the insulating box and the insulating door body, a vacuum heat insulation material being provided between an outer case and an inner case which have a space therebetween filled with rigid resin foam,
the vacuum heat insulation material comprising at least a core material and a covering material, the covering material covering the core material and being vacuum sealed, wherein
the covering material is a lamination body including at least two plastic film layers, one of a metal layer and a ceramic-deposited layer, and adhesive layers for joining therebetween, and
the lamination body has a stress-relieving structure in inner layers thereof, the stress-relieving structure being able to prevent penetration and propagation of breakage in a direction perpendicular to the lamination body.

23. The cold reserving apparatus of claim 22, wherein
when the lamination body is subjected to a compressive stress in a direction perpendicular thereto, one of interfaces of the lamination body is peeled in the covering material.

24. The cold reserving apparatus of claim 22, wherein
when the lamination body is subjected to a compressive stress in a direction perpendicular thereto, one of the plastic films or one of the adhesive layers is peeled in the covering material.

25. The cold reserving apparatus of claim 22, wherein
in the covering material, at least one of the joining layers is made of urethane resin containing a polyisocyanate and a polyester polyol, and an equivalent ratio of polyisocyanate to polyester polyol is not less than 1 and not more than 3.

* * * * *